United States Patent [19]
Krezanoski et al.

[11] 3,843,782
[45] *Oct. 22, 1974

[54] EYE SOLUTION AND METHOD OF USING SAME

[75] Inventors: Joseph Z. Krezanoski; John C. Petricciani, both of Los Altos, Calif.

[73] Assignee: Flow Pharmaceuticals, Inc., Palo Alto, Calif.

[ * ] Notice: The portion of the term of this patent subsequent to Dec. 22, 1988, has been disclaimed.

[22] Filed: July 26, 1971

[21] Appl. No.: 166,286

[52] U.S. Cl.............. 424/78, 424/153, 424/326, 424/329
[51] Int. Cl............................................ A61k 27/00
[58] Field of Search............................ 424/78, 153

[56] References Cited
UNITED STATES PATENTS

| | | | |
|---|---|---|---|
| 2,547,653 | 4/1951 | Minnis et al. | 424/153 |
| 3,311,577 | 3/1967 | Rankin | 424/78 |
| 3,549,747 | 12/1970 | Krezanoski et al. | 424/78 |

*Primary Examiner*—Albert T. Meyers
*Assistant Examiner*—Norman A. Drezin

[57] ABSTRACT

A hypertonic alkaline eye solution is provided which is useful in physiologically correcting eye discomfort resulting from corneal edema. The eye solution comprises a polymeric viscosity building agent, such as hydroxyethyl cellulose; an alkaline pH controlling agent such as sodium hydrogen carbonate; a readily metabolizable energy yielding metabolic intermediate agent; a microbial growth inhibitor, such as benzalkonium chloride; purified water; and sufficient amounts of essentially neutral, water-soluble salts, such as sodium chloride and potassium chloride, to make the solutions hypertonic. The eye solution can also contain a disodium ethylenediamine tetraacetate chelating agent, if desired.

2 Claims, No Drawings

EYE SOLUTION AND METHOD OF USING SAME

BACKGROUND OF THE INVENTION

This invention relates to eye solutions, and more particularly to hypertonic, alkaline eye solutions.

A disturbance in the normal process of excess tear removal from the cornea typically results in edema or swelling due to accumulation of excess fluid causing eye discomfort. Disturbances result from insults or injury to the cornea such as the reduction of oxygen to the cornea caused by irritants (smog, for example), removal of the mucoid layer (from shower water in the eye, swimming, or crying, for example), or the excess wearing of contact lenses. Frequently such insult or injury causes the cornea to become vascular. This response is an attempt by the body to remove the excess fluid.

A typical prior art approach in eye drops is to provide a vasoconstrictor to eliminate the "redness" caused by the vascular cornea. This approach is cosmetic; it does nothing to solve the edema or the increase in vascularity. Moreover, the edemic condition is worsened by the vasoconstrictive eye drop inasmuch as it defeats the body's mechanism for removing the excess corneal fluid.

In accordance with the present invention, an eye drop solution is provided that results in a natural physiological correction of edema by removing excess fluid in the cornea. No drug action or vasoconstriction occurs with use of the solution according to the present invention. The present invention provides a sterile, hypertonic eye drop solution containing a viscosity-building agent, a pH controlling agent to render the solution alkaline, a readily metabolizable energy yielding metabolic intermediate agent, a preservative for inhibiting a microbial growth in the solution, water, and sufficient amounts of one or more alkali metal salts to render the solution hypertonic.

The eye drop solution according to the present invention is particularly useful in treating eye discomfort resulting from eye exposure to highly chlorinated acid swimming pool water.

The invention consists in novel compositions, articles, products, and improvements shown and described. It is to be understood that both the foregoing general description and the following detailed description are exemplary and explanatory but are not restrictive of the invention.

The solution of this invention is an aqueous solution. The inert nature of water, and the fact that it is a good solvent for the other ingredients of the present solution, together with its ready availability, make it the desirable base material for this solution. The water used in the solution is preferably purified by distillation, filtration, ion-exchange or the like.

The solution of this invention contains a compatible, polymeric, viscosity-building agent. The viscosity-building agents must, of course, be water-soluble. Either cellulosic polymers or naturel gums or synthetically modified thickening agents are satisfactory viscosity-building agents for the solutions.

Thus, natural gums such as guar gum, gum tragacanth, gelatin and water-soluble starch derivatives can be used. Water-soluble cellulosic polymers such as hydroxyethyl cellulose, methyl cellulose, hydroxypropyl cellulose, carboxymethyl cellulose, and the like are preferred viscosity-building agents, with hydroxyethyl cellulose and methyl cellulose being considered optimum.

The viscosity-building agent used in the solution of this invention provides replacement of the corneal mucoid layer and corneal comfort, while avoiding stickiness of the eyelid and granulation on the eyelashes. These desirable properties are best achieved through the use of hydroxyethyl cellulose or methyl cellulose as the viscosity-building agents in appropriate concentrations.

Sufficient amounts of the viscosity-building agents are added to the solution, to produce a solution having a viscosity of about 15 to 750 cps. at 25°C. A viscosity of about 60 cps. at 25°C. is considered optimum. The use of medium viscosity cellulosic polymers, which are readily available commercially, is beneficial in achieving the desired viscosity in the solution. Exemplary of such medium viscosity polymers are M grade hydroxyethyl cellulose available from Hercules, Inc., under the trademark Natrosol. A 2% solution of this polymer at 25°C. has a Brookfield viscosity of about 4500–6500. It is to be understood, however, that cellulosic polymers of widely varying viscosities can be used satisfactorily in the yielding solutions of this invention. Thus, Natrosol polymers of viscosity grades H, G, and J from Hercules, Cellosize WP4400 from Union Carbide Corp. and various other commercially available hydroxyethyl cellulose can be used. The preferred grade of methyl cellulose for use in these wetting solutions is methyl cellulose U.S.P. XVII, which can be obtained commercially from Dow Chemical Co., Union Carbide and others.

Highly desirable eye drop solutions are produced by the incorporation of 0.2 to 1.0% of the viscosity-building agents in the solution.

The eye drop solution of this invention preferably contains sodium hydrogen carbonate ($NaHCO_3$) as the active alkaline pH controlling agent. A solution pH of about 8.5 is considered optimum, although a range of about 7.1 to 9.5 is acceptable. Numerous other biological buffering agents in the near alkaline region compatible with eye tissue are acceptable for pH control, however, sodium hydrogen carbonate is particularly desirable since its bicarbonate action results in carbon dioxide dissipation of any acid ingredients accumulated in the corneal layers. In addition, the sodium hydrogen carbonate reacts with small amounts of polyvinyl alcohol (PVA) in the solution to hydrolyze the PVA and form sodium acetate, $NaC_2H_3O_2$ to provide trace quantities of acetate ions which are useful as an energy yielding metabolic intermediate in the process of removing excess fluid from the cornea. Other biological buffering agents in the near alkaline region compatible with eye tissue that are usable as a pH controlling agent in the solution include sodium phosphate, sodium borate, and tris (hydroxymethyl) aminomethane.

PVA may be omitted and another readily metabolizable energy yielding metabolic intermediate agent provided instead of the sodium acetate resulting from the hydrolyzing of the PVA. Other suitable agents include acetate, glutamate, $\alpha$ ketoglutarate, succinate, lactate, glucose, citrate, pyruvic, oxaloacetic, malate, and fumarate. Although it has not been proven, applicant believes that this intermediate agent may provide fuel for substrates for corneal metabolism which in turn yields energy required to support the active process of removing the excess corneal fluid.

A preservative, designed to prevent or inhibit microbial growth is also included in the solution of this invention. The inclusion of such preservatives is particularly important where multi-dose bottles of the solution are prepared. The preservatives prevent bacteria from contaminating the solution after its container has been opened and initial use made of a portion of the solution.

A preferred preservative is benzalkonium chloride. This compound is an alkyl substituted dimethylbenzylammonium chloride wherein the alkyl substituents are a mixture of $C_8$ to $C_{18}$ alkyl radicals. Other well-known preservative agents such as cetylpyridinium chloride, chlorhexidine, phenylmercuric acetate, thimerosol and propyl or methyl paraben can be substituted wholly or partially for the preferred benzalkonium chloride preservative. In order to maintain sterility of the product during use, the preferred preservative should be present in an amount of about 0.001 to 0.2%, with the optimum concentration being about 0.005% for benzalkonium chloride.

The solution of this invention can optionally contain about 0.01 to 0.2% of disodium ethylenediamine tetraacetate, commonly known as sodium edetate. Sodium edetate provides additional protection against pseudomonal contamination, and also acts as a chelating or water softening agent. The sodium edetate ties up divalent and trivalent cations often present in the water. Preferred embodiments of the solution of this invention contain the sodium edetate additive.

A sufficient amount of an essentially neutral water-soluble alkali metal salt is incorporated in the solutions of this invention to render them hypertonic.

It will be appreciated that the osmotic pressure of the natural fluids of the eye may vary somewhat from one individual to another. Accordingly, it is generally advantageous for the solutions of this invention to contain the equivalent of 0.91 to 1.8 of sodium chloride. This range of tonicity is high enough to provide hypertonic solutions that can be mass produced for the vast majority of eye drop users. When the total tonicity of the formulation exceeds about 1.6%, the solution can produce mild stinging sensations in some users, and about 1.5% is therefore the upper limit of hypertonicity prescribed for the present solution for use in most patients. A tonicity equivalent to about 1.4% of NaCl is considered optimum in the solutions of this invention.

It is to be understood that one or more essentially neutral, water-soluble, alkali metal salts can be substituted in whole or in part for sodium chloride in the solutions of this invention. Thus, other alkali metal halides, such as sodium bromide, potassium chloride, potassium fluoride or potassium bromide can be used. Other salts, such as sodium sulfate, potassium sulfate, sodium nitrate, sodium phosphate, potassium nitrate or potassium phosphate can also be used. The tonicity of the solutions of this invention, however, is stated in terms of sodium chloride, and when such other salts are used, they should be present in amounts equivalent to the tonicity of 0.91 to 1.8% sodium chloride solutions.

It has been found that optimum solutions are produced using mixtures of sodium chloride and potassium chloride. The ratio of NaCl to KCl in these solutions is generally between about 2 to 1 and 10 to 1, and preferably between about 4 to 1 and 7 to 1. Optimum solutions produced in accordance with this invention contain both sodium chloride and potassium chloride in a NaCl to KCl ratio of about 5 to 1 and have a total tonicity equivalent to about 1.4% sodium chloride.

It must be remembered that the solutions described herein are designed primarily to be produced for mass distribution and are designed for the normal, average person whose serum and tear fluid have a tonicity equivalent to about 0.9% sodium chloride. To achieve the benefits of the present invention, however, it is necessary that the solution by hypertonic with respect to the serum and tear fluid of the particular person treated. Thus it is not claimed that the optimum compositions of this invention, which are designed for mass distribution, will be suitable for all individuals, and it may be necessary in some cases to design particular solutions having high tonicities of about 1.8% sodium chloride.

It should be noted in this regard that strongly hypertonic solutions containing glycerol and sodium chloride have in the past been employed on occasion by ophthalmologists as a means for reducing corneal edema in postsurgical techniques and the like. These strong solutions generally contain 5 to 10% sodium chloride and are in no way relative to the mildly hypertonic solutions of the present invention.

It should also be noted that the eye drop solution according to the present invention bears some similarity to the contact lens wetting solution of U.S. Pat. No. 3,549,747. The unexpected discovery of the present invention is that the addition of an alkaline pH agent and a readily metabolizable energy yielding metabolic intermediate agent results in an eye drop solution useful in physiologically treating an edemic corneal condition. It will be noted that the wetting action of PVA is not required in the present eye drop solution, hence when PVA is used only enough PVA is provided to react with the sodium hydrogen carbonate to produce traces of acetate ions.

It is not known whether all of the advantages set forth herein are derived from the alkalinity of the present solutions or from a combination of this alkalinity with the benefits from the hypertonicity or the mucoid replacing or viscosity-building agents or other of the remaining specified ingredients of the composition. Applicants accordingly do not wish to be limited to any particular theory for the success of their invention.

For a clearer understanding of the invention specific examples of it are set forth below. These examples are merely illustrative and are not to be understood as limiting the scope and underlying principles of the invention in any way. All parts and percentages referred to herein are parts by weight in terms of unit volume of solution unless otherwise specifically indicated. Thus a sodium chloride content of 0.9% in the solution is equivalent to 9.0 grams of sodium chloride per liter of solution.

Specific examples of the compositions of this invention are set forth in the following examples.

EXAMPLE 1

| Solution composition: | Percent |
|---|---|
| Hydroxyethyl cellulose (medium viscosity) | 0.8 |
| Polyvinyl alcohol | 0.125 |
| Sodium hydrogen carbonate ($NaHCO_3$) | 0.3 |
| Sodium chloride | 1.0 |
| Potassium chloride | 0.2 |
| Sodium edetate | 0.025 |
| Benzalkonium chloride | 0.005 |
| Purified water | Q.S. 100% |

EXAMPLE 2

| Solution composition: | Percent |
|---|---|
| Hydroxyethyl cellulose (medium viscosity) | 0.5 |
| Polyvinyl alcohol | 0.125 |
| Sodium hydrogen carbonate (NaHCO₃) | 0.3 |
| Sodium chloride | 1.6 |
| Potassium chloride | 0.2 |
| Sodium edetate | 0.025 |
| Benzalkonium chloride | 0.005 |
| Purified water | Q.S. 100% |

EXAMPLE 3

| Solution composition: | Percent |
|---|---|
| Methyl cellulose (medium viscosity) | 0.5 |
| Polyvinyl alcohol | 0.125 |
| Sodium hydrogen carbonate | 0.3 |
| Sodium chloride | 1.0 |
| Potassium chloride | 0.5 |
| Sodium edetate | 0.025 |
| Chlorhexidine | 0.005 |
| Purified water | Q.S. 100% |

These mixtures are produced by weighing and mixing solids separately. These are added to the purified water with stirring. The benzalkonium chloride is added and the mixture is heated in a double boiler for 1 to 1½ hours and upon cooling is aseptically dispensed into presterilized bottles.

The solution described herein is useful not only as an eye drop for relief of eye discomfort but is also useful as an occular submersion pre-corneal fluid. In the latter case, it is useful in various situations where the eye must be submerged for a long time in a fluid. For example, in conjunction with instrumentation for intraocular visualization the solution can be used in fluid holding goggles. Alternately, in diving or other situations where a fluid must be kept against the eye for long periods the present solution can be used. The solution can also be used with the scleral lens.

In a series of tests conducted by a licensed optometrist goggles were used to submerge the eyes of persons in test groups with three different fluids. Each fluid was tested on six or more persons. Fluid 1 was the solution according to U.S. Pat. No. 3,549,747. Fluid 2 was a normal saline solution, 0.9% with no viscosity-building agent. Fluid 3 was the solution of Example 1 given herein. After three minutes of eye submersion in fluids 1 and 2 all of the test participants experienced eye discomfort and showed measurable corneal swelling. Most of these participants experienced staining with 2% fluorescein. After 20 minutes of eye submersion in fluid 3 none of the test participants experienced eye discomfort and none had measurable corneal swelling. Some of the participants reported that their eyes felt better than when not submerged.

In a test conducted by a swimming coach, 15 children, all competition swimmers who typically spend 4 to 6 hours per day in a swimming pool, had one drop of the solution of Example 1 herein placed in one eye after spending several hours in a swimming pool. No solution was placed in the second eye. After a brief time period, 14 of the 15 experienced increased comfort in the treated eye and requested that a drop be placed in the second eye.

The invention, in its broader aspects, is not limited to the specific details shown and described, but departures may be made from such details within the scope of the accompanying claims without departing from the principles of the invention and without sacrificing its chief advantages.

What is claimed is:

1. An aqueous eye wash solution containing:
   a. a water soluble cellulosic polymer selected from the group consisting of hydroxyethyl cellulose, methyl cellulose, hydroxypropyl cellulose and carboxymethyl cellulose in amount sufficient to give the solution a viscosity in the range 15 to 750 cps at 25°C;
   b. a quantity of sodium chloride, potassium chloride or mixtures of sodium chloride and potassium chloride sufficient to make the solution hypertonic relative to a sodium chloride solution containing 0.9% by weight of sodium chloride but not hypertonic relative to 1.8 wt. % sodium;
   c. from 0.001 to 0.2% of a preservative agent selected from the group consisting of benzalkonium chloride and chlorhexidine;
   d. sodium bicarbonate in amount sufficient to give the solution a pH in the range 7.1 to 9.5; and
   e. about 0.125% by weight based on the total composition of polyvinyl alcohol.

2. The composition of claim 1 containing in addition from about 0.01 to 0.2% of sodium edatate.

* * * * *